United States Patent
Shimatani et al.

(10) Patent No.: US 7,941,295 B2
(45) Date of Patent: May 10, 2011

(54) MANUFACTURING APPARATUS, INFORMATION PROCESSING METHOD, AND PROGRAM

(75) Inventors: Hiroshi Shimatani, Fuchu (JP); Noriaki Shioyama, Sapporo (JP)

(73) Assignee: Tokyo Electron Limited (JP)

( * ) Notice: Subject to any disclaimer, the term of this patent is extended or adjusted under 35 U.S.C. 154(b) by 147 days.

(21) Appl. No.: 12/366,225

(22) Filed: Feb. 5, 2009

(65) Prior Publication Data

US 2009/0198368 A1 Aug. 6, 2009

(30) Foreign Application Priority Data

Feb. 5, 2008 (JP) ................................. 2008-024980

(51) Int. Cl.
*G06F 19/00* (2006.01)

(52) U.S. Cl. ........ 702/184; 702/108; 716/102; 716/113; 716/136; 716/52; 716/50; 700/96; 700/97; 700/95; 700/100; 700/121; 700/116; 707/999.107; 438/14; 438/15

(58) Field of Classification Search .................. 702/6, 4, 702/21, 11, 19, 184, 108; 700/96, 97, 95, 700/100, 121, 116, 182, 98; 707/999.107; 438/14, 15, 16; 716/102, 113, 136, 52, 50

See application file for complete search history.

(56) References Cited

U.S. PATENT DOCUMENTS

| | | | | |
|---|---|---|---|---|
| 6,303,398 B1 * | 10/2001 | Goerigk | ........................... | 438/14 |
| 6,630,362 B1 * | 10/2003 | Lensing | ........................... | 438/14 |
| 7,006,883 B2 * | 2/2006 | Yamazaki | ...................... | 700/97 |
| 7,123,980 B2 * | 10/2006 | Funk et al. | .................... | 700/121 |
| 7,343,583 B2 * | 3/2008 | Keck et al. | ...................... | 716/19 |
| 7,346,883 B2 * | 3/2008 | Keck et al. | ....................... | 716/19 |
| 7,574,682 B2 * | 8/2009 | Riviere-Cazaux | ................ | 716/4 |
| 7,613,534 B1 * | 11/2009 | Yazback et al. | ................. | 700/96 |
| 2005/0187649 A1 * | 8/2005 | Funk et al. | .................... | 700/121 |
| 2005/0197730 A1 * | 9/2005 | Hsu et al. | ...................... | 700/121 |
| 2006/0123381 A1 * | 6/2006 | Nakamura et al. | .............. | 716/21 |
| 2010/0140352 A1 * | 6/2010 | Silverbrook et al. | ......... | 235/385 |

FOREIGN PATENT DOCUMENTS

| | | |
|---|---|---|
| JP | 07-297257 | 11/1995 |
| JP | 2002-025997 | 1/2002 |
| JP | 2004-206702 | 7/2004 |
| WO | 2007/122902 | 11/2007 |

OTHER PUBLICATIONS

Japanese Office Action-Application No. 2008-024980 issued Feb. 25, 2010.

* cited by examiner

*Primary Examiner* — Carol S Tsai
(74) *Attorney, Agent, or Firm* — Cantor Colburn LLP

(57) ABSTRACT

Provided is a manufacturing apparatus for appropriately managing information about parts of the manufacturing apparatus. The manufacturing apparatus includes: a parts identification information receiving unit receiving parts identification information used to identify parts of the manufacturing apparatus for performing a semiconductor process with respect to a substrate to be processed; a parts attribute information receiving unit receiving parts attribute information indicating the attribute of the parts identified by the received parts identification information; a parts attribute corresponding information memory unit storing parts attribute corresponding information where the parts identification information identifying the parts of the manufacturing apparatus corresponds to parts attribute information identified by the parts identification information; and a parts attribute corresponding information managing unit updating the parts attribute corresponding information by using the received parts identification information and the received parts attribute information.

9 Claims, 12 Drawing Sheets

FIG. 5

| Parts identification information | Parts attribute corresponding information | | |
|---|---|---|---|
| | Parts attribute information | | |
| | Name of parts | Model number | Use history information (number) |
| P001 | AAA | 1234 | 0 |
| P101 | XYZ | 9876 | 12 |
| ... | ... | ... | ... |

FIG. 6

| Parts identification information | Parts attribute corresponding information | | |
|---|---|---|---|
| | Parts attribute information | | |
| | Name of parts | Model number | Use history information (number) |
| P001 | AAA | 1234 | 1 |
| P101 | XYZ | 9876 | 12 |
| ... | ... | ... | ... |

FIG. 7

| Parts type identification information ||  Lifespan information |
|---|---|---|
| Name of parts | Model number | |
| AAA | 1234 | 20 |
| XYZ | 9876 | 30 |
| ⋮ | ⋮ | ⋮ |

Lifespan corresponding information

FIG. 8

| Parts identification information | Parts attribute corresponding information | | |
| --- | --- | --- | --- |
| | Parts attribute information | | |
| | Name of parts | Model number | Use history information (number) |
| P001 | AAA | 1234 | 20 |
| P101 | XYZ | 9876 | 12 |
| ... | ... | ... | ... |

FIG. 9

| Parts identification information | Parts attribute information | | |
| --- | --- | --- | --- |
| | Name of parts | Model number | Use history information (number) |
| P001 | AAA | 1234 | 3 |
| P002 | BBB | 2345 | 0 |
| P003 | CCC | 3456 | 0 |
| P004 | DDD | 4567 | 16 |
| ... | ... | ... | ... |

FIG. 10

| Parts identification information | Parts attribute information | | |
|---|---|---|---|
| | Name of parts | Model number | Use history information (number) |
| P001 | AAA | 1234 | 20 |
| P002 | BBB | 2345 | 0 |
| P003 | CCC | 3456 | 0 |
| P004 | DDD | 4567 | 16 |
| ... | ... | ... | ... |

MANUFACTURING APPARATUS, INFORMATION PROCESSING METHOD, AND PROGRAM

CROSS-REFERENCE TO RELATED PATENT APPLICATION

This application claims the benefit of Japanese Patent Application No. 2008-24980, filed on Feb. 5, 2008, in the Japan Patent Office, the disclosure of which is incorporated herein in their entirety by reference.

BACKGROUND OF THE INVENTION

1. Field of the Invention

The present invention relates to a manufacturing apparatus for managing the attributes of parts of the manufacturing apparatus, an information processing method, and a program.

2. Description of the Related Art

A general system for managing parts of a semiconductor manufacturing apparatus is disclosed in, for example, Reference 1.

Also, as related technology, a batch type vertical heat treatment device is disclosed in References 2 and 3.

Reference 1: Japanese Patent Publication No. 2004-206702

Reference 2: Japanese Patent Publication No. 1995-297257

Reference 3: Japanese Patent Publication No. 2002-25997

Parts of a manufacturing apparatus, such as a semiconductor manufacturing apparatus, differ in terms of material, surface processing, and shape by about several millimeters, which cannot be easily seen with the naked eye. Furthermore, the parts are not determined in view of the appearance thereof, and thus a database of the parts is necessary. However, parts of the manufacturing apparatus, such as the conventional semiconductor manufacturing apparatus, and information about the parts are generally separately managed. For example, a plurality of databases including a database of a factory, which is used to order the parts, a database of the factory, which is used as a shipping history of the parts, and a repair and maintenance service database used to provide a repair service regarding the parts, have generally been managed. Such a plurality of databases have caused discrepancies between the parts which are actually used and information about the parts which are managed. For example, after the parts are installed, when the parts are replaced for repair and maintenance reasons, different information about the parts is stored in an order database and a maintenance database.

SUMMARY OF THE INVENTION

The present invention provides a manufacturing apparatus for appropriately managing information about parts of the manufacturing apparatus.

According to an aspect of the present invention, there is provided a manufacturing apparatus for performing a semiconductor process with respect to a substrate to be processed, the manufacturing apparatus comprising: a parts identification information receiving unit receiving parts identification information used to identify parts of the manufacturing apparatus; a parts attribute information receiving unit receiving parts attribute information indicating the attribute of the parts identified by the parts identification information received by the parts identification information receiving unit; a parts attribute corresponding information memory unit storing parts attribute corresponding information where the parts identification information identifying the parts of the manufacturing apparatus corresponds to parts attribute information identified by the parts identification information; and a parts attribute corresponding information managing unit updating the parts attribute corresponding information by using the parts identification information received by the parts identification information receiving unit and the parts attribute information received by the parts attribute information receiving unit.

The manufacturing apparatus manages the parts thereof, thereby more accurately managing the parts. Therefore, information about the parts stored in a plurality of database may be different from each other, which can be avoided.

The parts attribute corresponding information managing unit may store the parts attribute corresponding information including the parts identification information in the parts attribute corresponding information memory unit when the parts are installed in the manufacturing apparatus, wherein the parts attribute information includes use history information about a use history of the parts.

The use history of the parts may be managed, thereby determining how long the parts will be used from now on.

The parts attribute corresponding information managing unit may update the use history information according to a use status of the parts.

The use history information about the parts may be updated as the parts is used by the manufacturing apparatus, thereby maintaining the latest use history information about the parts included in the parts attribute corresponding information.

The parts attribute information receiving unit may further receive parts attribute information including the past use history information of the parts installed in the manufacturing apparatus, wherein the parts attribute corresponding information managing unit updates the parts attribute information of the parts attribute corresponding information corresponding to the parts attribute information by using the past use history information included in the parts attribute information received by the parts attribute information receiving unit.

The past use history information may be succeeded, thereby making the use history information more accurate.

The manufacturing apparatus may further comprise: when the parts have been removed from the manufacturing apparatus, a first parts attribute information outputting unit outputting the parts attribute information including the use history information included in the parts attribute corresponding information about the parts.

The use history information about the parts that have been used by the manufacturing apparatus may be succeeded to other manufacturing devices that use the parts.

The parts attribute corresponding information may include parts type identification information used to identify a type of the parts, further comprising: a lifespan corresponding information memory unit storing lifespan corresponding information where the parts type identification information corresponds to lifespan information indicating a useful lifespan of the parts; a lifespan determining unit determining whether the useful lifespan of the parts corresponding to the parts attribute corresponding information has come to an end by using the lifespan information corresponding to the parts type identification information included in the parts attribute corresponding information and the use history information included in the parts attribute corresponding information; and a lifespan expiration information outputting unit outputting lifespan expiration information including at least the parts identification information of the parts whose lifespan is determined to have expired by the lifespan determining unit.

A user may be informed of lifespan expiration dates of the parts that are used by the manufacturing apparatus, thereby ordering the parts whose lifespan has expired.

The manufacturing apparatus may further include an output instruction information receiving unit receiving output instruction information for instructing the parts attribute information included in the parts attribute corresponding information to be output, and a second parts attribute information outputting unit reading parts attribute information instructed to be output from the output instruction information received by the output instruction information receiving unit from the parts attribute corresponding information memory unit and outputting the parts attribute information.

The parts attribute information included in the parts attribute corresponding information managed by the manufacturing apparatus is output so that the user can confirm the parts attribute information.

BRIEF DESCRIPTION OF THE DRAWINGS

The above and other features and advantages of the present invention will become more apparent by describing in detail exemplary embodiments thereof with reference to the attached drawings in which:

FIG. 5 is a table showing an example of parts attribute corresponding information according to the embodiment of the present invention;

FIG. 6 is a table showing an example of parts attribute corresponding information according to the embodiment of the present invention;

FIG. 7 is a table showing an example of lifespan corresponding information according to the embodiment of the present invention;

FIG. 8 is a table showing an example of parts attribute corresponding information according to the embodiment of the present invention;

FIG. 9 is a table showing an example of parts attribute information included in a server device according to the embodiment of the present invention;

FIG. 10 is a table showing another example of parts attribute information included in a server device according to the embodiment of the present invention;

DETAILED DESCRIPTION OF THE INVENTION

Figure 1:
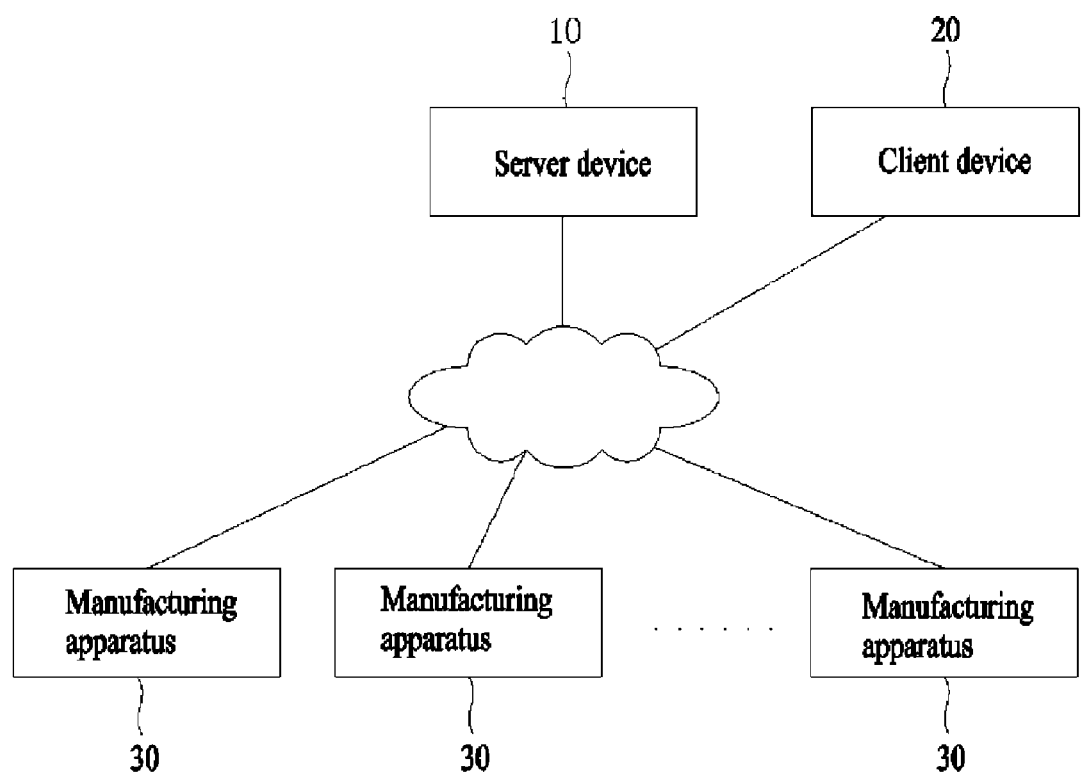
FIG. 1 is a block diagram of a group management system according to an embodiment of the present invention.

Hereinafter, the present invention will be described in detail by explaining embodiments of the present invention with reference to the attached drawings. Like reference numerals in the drawings denote like elements, and thus repeated descriptions thereof will be omitted.

FIG. 1 is a block diagram of a group management system according to an embodiment of the present invention. Referring to FIG. 1, the group management system of the present embodiment includes a server device 10, a client device 20, and N manufacturing apparatuses 30. In this regard, N denotes 1 or a positive integer greater than 2. The server device 10, the client device 20, and the N manufacturing apparatuses 30 included in the group management system are connected via a wired or wireless communication line so as to communicate with each other. The communication line is, for example, the Internet, Intranet, or a public switched telephone network (PSTN).

The server device 10 may store various types of measurement information with respect to the N manufacturing apparatuses 30. The server device 10 performs processing operations according to a request received from the client device 20 and transmits a processing result to the client device 20. The server device 10 may obtain parts attribute corresponding information, which will be described later, corresponding to the attributes of parts from the N manufacturing apparatuses 30 and may manage the information of each manufacturing apparatus 30.

The manufacturing apparatuses 30 perform a predetermined semiconductor process with respect to a substrate to be processed. The manufacturing apparatuses 30 may be, for example, a semiconductor manufacturing apparatus, a liquid crystal panel manufacturing apparatus, an organic electroluminescent (EL) display manufacturing apparatus, and a plasma display panel manufacturing apparatus. The substrate to be processed may be, for example, a semiconductor wafer or a flat panel display (FPD) substrate. The FPD substrate may be, for example, a glass substrate. The predetermined semiconductor process performed by the manufacturing apparatuses 30 may or may not include pre-processing or post-processing if the predetermined semiconductor process includes at least one process with respect to a semiconductor. The manufacturing apparatuses 30 may perform, for example, a film forming process, an etching process, or a thermal oxidation process with respect to the substrate to be processed.

The client device 20 requires various processing operations to be performed with respect to the server device 10 or the manufacturing apparatuses 30. The client device 20 also receives results of the required processing.

Figure 2:
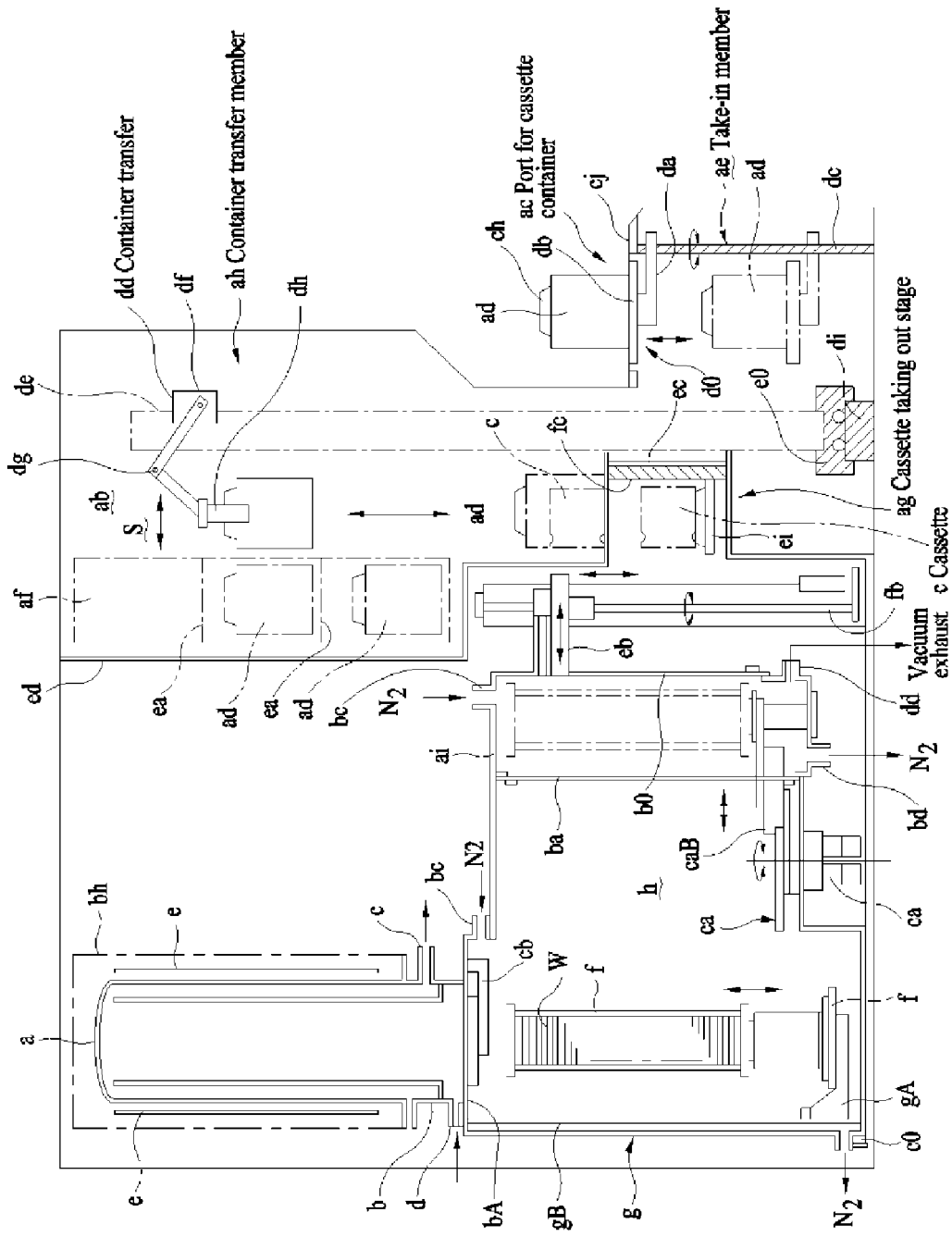
FIG. 2 is an exemplary diagram of a manufacturing apparatus shown in FIG. 1.

The manufacturing apparatuses 30 are batch type vertical thermal treatment apparatuses disclosed in References 2 or 3. FIG. 2 is an exemplary diagram of one of the manufacturing apparatuses 30 according to an embodiment of the present invention. The manufacturing apparatus 30 is configured to have a load lock chamber h, which is a loading chamber that is hermetically sealed with respect to other chambers, and in which an $N_2$ gas is supplied and vacuumed as an inert atmosphere. The manufacturing apparatus 30 includes a process tube a that is a processing chamber for performing predetermined processing with respect to a material to be processed, a wafer W, the load lock chamber h that is the loading chamber including a conveying instrument g that inserts and extracts a wafer boat (a pair of supports) f that is a support storing a plurality of sheets of the wafer W, for example, 100 sheets, with respect to the process tube a (the processing chamber), a wafer take-in and take-out chamber ab that takes in and out the wafer W with respect to the load lock chamber h, a port ac for a cassette container ad formed in the wafer take-in and take-out chamber ab, a take-in member ae that takes in the cassette container ad disposed above the port ac into the wafer take-in and take-out chamber ab, a container accommodating stage af that temporarily accommodates the cassette container ad, a cassette taking out stage ag that takes out a cassette C accommodated in the cassette container ad, a container transfer member ah that guides the cassette container ad in the wafer take-in and take-out chamber ab, and a support chamber ai that accommodates the wafer boat f disposed between the load lock chamber h and the wafer take-in and take-out chamber ab. Other components and the operation of the manufacturing apparatus 30 shown in FIG. 2 are well known (refer to Reference 2) and thus detailed descriptions thereof will not be repeated here. A chamber shown in FIG. 1 of Reference 3 is very suitable as a chamber included in the manufacturing apparatus 30. The present invention is not limited to the manufacturing apparatus 30 shown in FIG. 2 and any types of manufacturing apparatuses may be applied to the present invention. The manufacturing apparatuses 30 maintain information, e.g., a recipe, about the predetermined semiconductor process with respect to the substrate to be processed and executes a process control operation by using the recipe.

Figure 3:
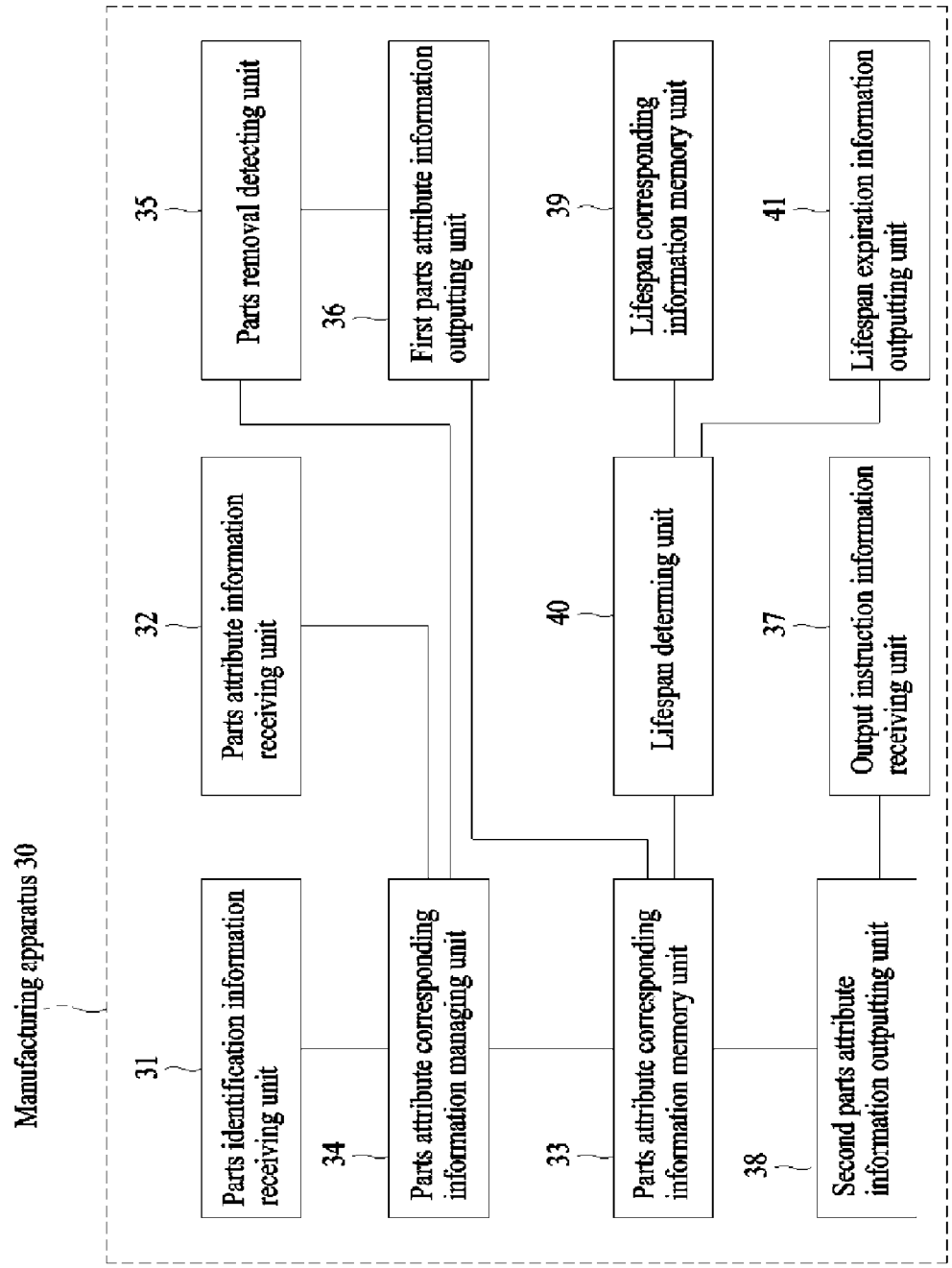
FIG. 3 is a block diagram of the manufacturing apparatus shown in FIG. 1.

FIG. 3 is a block diagram of the manufacturing apparatus 30 according to an embodiment of the present invention. Although the block diagram in FIG. 3 shows only the main characterizing elements of the group management system according to the present embodiment, the manufacturing apparatus 30 may include a feature of executing a predetermined semiconductor process with respect to a substrate to be processed, for example, a feature of carrying the substrate to be processed or a feature of transmitting information about a temperature or pressure to the server device 10 during a manufacturing process.

The manufacturing apparatus 30 includes a parts identification information receiving unit 31, a parts attribute information receiving unit 32, a parts attribute corresponding information memory unit 33, a parts attribute corresponding information managing unit 34, a parts removal detecting unit 35, a first parts attribute information outputting unit 36, an output instruction information receiving unit 37, a second parts attribute information outputting unit 38, a lifespan corresponding information memory unit 39, a lifespan determining unit 40, and a lifespan expiration information outputting unit 41.

The parts identification information receiving unit 31 receives parts identification information used to identify parts of the manufacturing apparatus 30. The parts identification information may include any type of information as long as the parts identification information defines the parts to have a meaning. The parts identification information may be, for example, information in an individual manner or information including names of the parts, model numbers thereof, and manufacturing numbers (a serial number) thereof or other information. The present invention is not limited to any particular type of the parts so long as the parts are used in the manufacturing apparatus 30. For example, the parts may be a wafer boat, a shower head, a focus ring, a heater, and a wafer loading table.

The parts identification information receiving unit 31 may receive the parts identification information regardless of timing. For example, when a rule-based action regarding the parts is taken, the parts identification information receiving unit 31 may receive the parts identification information about the parts with respect to the taken action. The rule-based action may be, for example, installation of the parts, removal thereof, repair thereof, destruction thereof, and maintenance thereof. When the action is taken, the parts identification information receiving unit 31 may automatically or manually receive the parts identification information. In the former, when an action detecting unit (not shown) included in the manufacturing apparatus 30 detects the action regarding the parts, the parts identification information receiving unit 31 may obtain the parts identification information about the parts with respect to the taken action. When the parts identification information receiving unit 31 receives the parts identification information at the time when the rule-based action is taken, the parts identification information receiving unit 31 may receive action identification information used to identify the action as well as the parts identification information.

The parts identification information receiving unit 31 may receive, for example, the parts identification information input by an input device (for example, a keyboard, a mouse, or a touch panel, etc.), the parts identification information transmitted through a wired or wireless communication line, or the parts identification information read from a predetermined recording medium (for example, an optical disk, a magnetic disk, or a semiconductor memory, etc.). The parts identification information receiving unit 31 may or may not include a receiving device (for example, a modem, a network card, etc.). The parts identification information receiving unit 31 may be realized in hardware or software, such as a driver for operating a predetermined device.

The parts attribute information receiving unit 32 receives parts attribute information indicating the attributes of the parts identified by the parts identification information received by the parts identification information receiving unit 31. The parts attribute information receiving unit 32 may or may not receive the parts attribute information at the time when the parts identification information receiving unit 31 receives the parts identification information. In either case, it is preferable that the parts attribute information and the parts identification information are related to each other. The parts attribute information and the parts identification information may be directly or indirectly related to each other. In the former, for example, the parts attribute information and the parts identification information may have corresponding relationship information in order to relate the parts attribute information and the parts identification information to each other. In more detail, the parts attribute information and the parts identification information may be determined to be related to each other when the parts attribute information and the parts identification information have the same information or information having a predetermined relationship (this may be information having a relationship in which a value obtained by carrying out a predetermined calculation (for example, 1 is added, a reciprocal number is used, ciphers are exchanged, etc.) on a value indicating one piece of information is a value indicating another piece of information). When the parts attribute information and the parts identification information are indirectly related to each other, for example, the parts identification information received by the parts identification information receiving unit 31 and the parts attribute information received by the parts attribute information receiving unit 32 within a predetermined period may be determined to be related to each other. When the parts attribute information receiving unit 32 receives the parts attribute information and the parts identification information receiving unit 31 receives the parts identification information simultaneously, the parts identification information receiving unit 31 and the parts attribute information receiving unit 32 may or may not be an integral element.

The parts attribute information may or may not include, for example, use history information about the parts, names of the parts, model numbers thereof, manufacturing numbers (a serial number) thereof, a name of a person in charge of the parts, a contact number of the person in charge of the parts, size or quantity thereof, and other information about the parts. The use history information included in the parts attribute information may be, for example, information about a start time (e.g. year-month-day or time) to begin using the parts, information about the parts use period, information about the parts use number, and other information about how long the parts have been used.

The parts attribute information receiving unit 32 may receive the parts attribute information regardless of timing. For example, when a rule-based action regarding the parts is taken, the parts attribute information receiving unit 32 may receive the parts attribute information about the parts with respect to the taken action. When the action is taken, the parts attribute information receiving unit 32 may automatically or manually receive the parts attribute information. In the former, when an action detecting unit (not shown) included in the manufacturing apparatus 30 detects the action regarding the parts, the parts attribute information receiving unit 32 may obtain the parts attribute information about the parts with respect to the taken action.

The parts attribute information receiving unit 32 may receive parts attribute information including past use history information about the parts installed in the manufacturing apparatus 30. The past use history information, for example, may be use history information about the parts used in another apparatus when the parts are removed from another apparatus and are installed in the manufacturing apparatus 30.

The parts attribute information receiving unit 32 may receive, for example, the parts attribute information input by an input device (for example, a keyboard, a mouse, or a touch panel, etc.), the parts attribute information transmitted through a wired or wireless communication line, or the parts attribute information read from a predetermined recording medium (for example, an optical disk, a magnetic disk, or a semiconductor memory, etc.). The parts attribute information receiving unit 32 may or may not include a receiving device (for example, a modem, a network card, etc.). The parts attribute information receiving unit 32 may be realized in hardware or software, such as a driver for operating a predetermined device.

The parts identification information receiving unit 31 and the parts attribute information receiving unit 32 may read the parts identification information and the parts attribute information, respectively that are included in, for example, a two dimensional barcode or radio frequency identification (RFID) and may receive the parts identification information and the parts attribute information, respectively, over a communication network such as deviceNet. The two dimensional barcode or the RFID may or may not be attached to the parts.

The parts attribute corresponding information memory unit 33 stores parts attribute corresponding information. The parts attribute corresponding information is information corresponding to the parts identification information used to identify the parts of the manufacturing apparatus 30 and the parts attribute information of the parts identified by the parts identification information. The parts identification information included in the parts attribute corresponding information is received by the parts identification information receiving unit 31. The parts attribute information included in the parts attribute corresponding information may or may not be received by the parts attribute information receiving unit 32. In the latter, as will be described later, the parts attribute information updated by the parts attribute corresponding information managing unit 34 may be included in the parts attribute corresponding information. Alternatively, the parts attribute information received by the parts attribute information receiving unit 32 may be information indicating a change in the attributes of the parts, and the parts attribute information included in the parts attribute corresponding information may be information (other than the change) indicating the attribute of the parts.

The parts attribute corresponding information may include parts type identification information used to identify part types. The parts type identification information may be, for example, information in the individual manner or information including names and model numbers of the parts, or other information. In the present embodiment, the parts type identification information is included in the parts attribute corresponding information.

The parts attribute corresponding information memory unit 33 may store the parts attribute corresponding information in a random-access memory (RAM) temporarily or for a long time. The parts attribute corresponding information memory unit 33 may be realized by a predetermined recording medium (for example, a semiconductor memory, a magnetic disk, or an optical disk, etc.).

The parts attribute corresponding information managing unit 34 updates the parts attribute corresponding information by using the parts identification information received by the parts identification information receiving unit 31 and the parts attribute information received by the parts attribute information receiving unit 32. The updating of the parts attribute corresponding information includes newly preparing (i.e. newly storing), changing, and deleting the parts attribute corresponding information, etc. The parts attribute corresponding information managing unit 34 may update the parts attribute corresponding information by using either or both of the parts identification information received by the parts identification information receiving unit 31 and the parts attribute information received by the parts attribute information receiving unit 32.

The parts attribute corresponding information managing unit 34 may store the parts attribute corresponding information including the parts identification information in the parts attribute corresponding information memory unit 33 when the parts are installed in the manufacturing apparatus 30. The parts attribute corresponding information managing unit 34 may update the parts attribute information included in the parts attribute corresponding information by using past use history information included in the parts attribute information received by the parts attribute information receiving unit 32. The parts attribute corresponding information managing unit 34 may invalidate the parts attribute corresponding information including the parts identification information when the parts are removed from the manufacturing apparatus 30. The invalidating of the parts attribute corresponding information may include, for example, deleting the parts attribute corresponding information, establishing a flag indicating an invalidation in the parts attribute corresponding information, or performing other processing operations.

The parts attribute corresponding information managing unit 34 may update the use history information according to a use status of the parts. In this regard, a method of obtaining the use status of the parts will now be briefly described. The parts attribute corresponding information managing unit 34 may obtain a use status of the manufacturing apparatus 30 as the use status of the parts. Alternatively, in order to obtain the use status of the parts, the parts attribute corresponding information managing unit 34 may change the use status of the manufacturing apparatus 30 to the use status of the parts by using information corresponding to the use status of the manufacturing apparatus 30 and the use status of the parts. For example, if the use status of the manufacturing apparatus 30 to the use status of the parts is 2:1, half of the use status of the manufacturing apparatus 30 may be obtained as the use status of the parts. The parts attribute corresponding information managing unit 34 may obtain the use status of each of the parts according to control performed with respect to each of the parts. For example, if the parts are controlled to be used one time, the parts attribute corresponding information managing unit 34 may obtain the one time use as the use status of the parts. The parts attribute corresponding information managing unit 34 may obtain the use status of the parts by using the total process time. In this case, the parts attribute corresponding information managing unit 34 may obtain the total process time as the use status of the parts or change the total process time to the use status of the parts. A process time is, for example, a gas introduction time or a plasma application time. The use status of the parts or the manufacturing apparatus 30 may be, for example, information about a start time (e.g. year-month-day or time) to begin using the parts or the manufacturing apparatus 30, information about the parts use period or the manufacturing apparatus use period, information about the parts use number or the manufacturing apparatus use number, and other information about how long the manufacturing apparatus 30 or the parts have been used.

The parts attribute corresponding information managing unit 34 may update the parts attribute corresponding information regardless of timing. For example, the parts attribute corresponding information managing unit 34 may update the parts attribute corresponding information when the parts identification information receiving unit 32 receives the parts identification information, when the parts attribute information receiving unit 31 receives the parts attribute information, or when the use status of the parts is obtained. The parts attribute corresponding information managing unit 34 may store the parts attribute corresponding information including the parts identification information when the parts are installed in the manufacturing device 30, or may update the parts attribute information included in the parts attribute corresponding information by using the past use history information included in the parts attribute information received by the parts attribute information receiving unit 32 when the parts attribute information receiving unit 32 receives the past use history information of the parts installed in the manufacturing apparatus 30.

When the parts identification information receiving unit 31 or the parts attribute information receiving unit 32 receives action identification information, the action identification information may be included in the parts attribute corresponding information stored in the parts attribute corresponding information memory unit 33 through the parts attribute corresponding information managing unit 34. When the parts attribute corresponding information managing unit 34 stores the action identification information in the parts attribute corresponding information, the parts attribute corresponding information managing unit 34 may store year-month-day or time of storing the action identification information as well as the action identification information. Thus, the parts attribute corresponding information stores information about what action has been carried out with respect to the parts. The parts attribute corresponding information managing unit 34 may obtain the year-month-day or time from a calendar (not shown) or a clock (not shown).

The parts removal detecting unit 35 detects removal of the parts from the manufacturing apparatus 30 regardless of a method of detecting removal of the parts. For example, when a sensor or other tool is used to constantly determine whether the parts are installed, the parts removal detecting unit 35 may detect removal of the parts when the parts are no longer installed or when removal of the parts is input by a user through an input device, or may use another method if removal of the parts is appropriately detected.

The first parts attribute information outputting unit 36 outputs the parts attribute information including the use history information included in the parts attribute corresponding information corresponding to the parts when the parts are removed from the manufacturing apparatus 30. In the present embodiment, the first parts attribute information outputting unit 36 outputs the parts attribute information corresponding to the parts when the parts removal detecting unit 35 detects removal of the parts. The parts attribute information corresponding to the removed parts is included in the parts attribute corresponding information including the parts identification information used to identify the removed parts, and includes the use history information included in the parts attribute corresponding information. The first parts attribute information outputting unit 36 may, for example, receive the parts identification information corresponding to the removed parts from the parts removal detecting unit 35, search for the parts attribute corresponding information stored in the parts attribute corresponding information memory unit 33 by using the parts identification information as a search key, and obtain and output the parts attribute information including the use history information from the relevant (hit) parts attribute corresponding information. The parts attribute information output by the first parts attribute information outputting unit 36 may be identical to or different from the parts attribute information included in the parts attribute corresponding information, except that the first parts attribute information outputting unit 36 outputs the parts attribute information including the use history information. For example, although the parts attribute information included in the parts attribute corresponding information includes a name of a person in charge of the parts, the parts attribute information output by the first parts attribute information outputting unit 36 may not include the name of the person in charge of the parts. Thus, the parts attribute information output by the first parts attribute information outputting unit 36 may be a part of the parts attribute information included in the parts attribute corresponding information.

The outputting of the parts attribute information may include, for example, displaying the parts attribute information on a display device (e.g., a cathode ray tube (CRT) or a liquid crystal display (LCD), etc.), transmitting the parts attribute information to a predetermined device through a communication line, printing the parts attribute information via printer, storing the parts attribute information in a recording medium, or transferring the parts attribute information to another element. The first parts attribute information outputting unit 36 may or may not include an outputting device (e.g., the display device or a printer, etc.) The first parts attribute information outputting unit 36 may be realized in hardware or software, such as a driver for operating a predetermined device.

The output instruction information receiving unit 37 receives output instruction information used to instruct output of the parts attribute information included in the parts attribute corresponding information. It is preferable that the output instruction information may include information used to specify the parts attribute information that is to be output. The information used to specify the parts attribute information that is to be output may be, for example, the parts identification information, names or model numbers of the parts, or other information. The output instruction information may be information used to instruct that all pieces of the parts attribute information be output.

The output instruction information receiving unit 37 may receive the output instruction information input by an input device (for example, a keyboard, a mouse, or a touch panel, etc.), or the output instruction information transmitted through a wired or wireless communication line. The output instruction information receiving unit 37 may or may not include a receiving device (for example, a modem, a network card, etc.). The output instruction information receiving unit 37 may be realized in hardware or software, such as a driver for operating a predetermined device.

The second parts attribute information outputting unit 38 reads, from the parts attribute corresponding information memory unit 33, the parts attribute information that is instructed to be output from the output instruction information received by the output instruction information receiving unit 37 and outputs the read parts attribute information. The second parts attribute information outputting unit 38 may, for example, search for the parts attribute corresponding information stored in the parts attribute corresponding information memory unit 33 by using the information used to specify the parts attribute information included in the output instruction information, obtain the parts attribute information from the relevant (hit) parts attribute corresponding information, and output the parts attribute information.

The outputting of the parts attribute information may include, for example, displaying the parts attribute information on a display device (e.g., a CRT or a LCD, etc.), transmitting the parts attribute information to a predetermined device through a communication line, printing the parts attribute information via a printer, storing the parts attribute information in a recording medium, or transferring the parts attribute information to another element. The second parts attribute information outputting unit 38 may or may not include an outputting device (e.g., the display device or a printer, etc.) The second parts attribute information outputting unit 38 may be realized in hardware or software, such as a driver for operating a predetermined device.

The lifespan corresponding information memory unit 39 stores lifespan corresponding information used to correspond the parts type identification information and lifespan information indicating the lifespan of the parts. The parts type identification information may be, for example, individual information used to identify a type of the parts or a name or a model number of the parts. Any types of information may be the lifespan information if it indicates the lifespan of the parts. The lifespan information may be, for example, a use number (e.g. 100 times), a use period (e.g. one year), or year-month-day or time (e.g. Dec. 20, 2007) indicating the lifespan of the parts. The lifespan information may be established to be shorter than a given lifespan. For example, if the use number indicates the given lifespan as 100 times, the lifespan information may be established as '95 times'.

The lifespan corresponding information memory unit 39 stores the lifespan corresponding information regardless of a memory storage process. For example, the lifespan corresponding information memory unit 39 may store the lifespan corresponding information on a recording medium, over a communication line, or through an input device. The lifespan corresponding information memory unit 39 may store the lifespan corresponding information in a RAM temporarily or for a long time. The lifespan corresponding information memory unit 39 may be realized by a predetermined recording medium (for example, a semiconductor memory, a magnetic disk, or an optical disk, etc.).

The lifespan determining unit 40 determines whether the lifespan of the parts corresponding to the parts attribute corresponding information has expired by using the lifespan information corresponding to the parts type identification information included in the parts attribute corresponding information and the use history information included in the parts attribute corresponding information. In more detail, the lifespan determining unit 40 obtains parts type identification information and use history information from parts attribute corresponding information about parts, searches for the lifespan corresponding information stored in the lifespan corresponding information memory unit 39 by using the obtained parts type identification information as a search key, and obtains the lifespan information included in a record of the relevant (hit) lifespan corresponding information. The lifespan determining unit 40 compares the obtained lifespan information with the use history information previously obtained from the parts attribute corresponding information and determines whether the useful lifespan of the parts has come to an end. The lifespan determining unit 40 may, for example, determine that the useful lifespan of the parts has come to an end if a use history indicated by the use history information is the same as or greater than the lifespan of the parts indicated by the lifespan information. The lifespan determining unit 40 may, for example, determine that the useful lifespan of the parts has come to an end if information (e.g. information that is 1.1 times the use history) obtained by increasing the use history indicated by the obtained use history information by a predetermined number is the same as or greater than the lifespan of the parts indicated by the lifespan information. The lifespan determining unit 40 may, for example, determine that the useful lifespan of the parts has come to an end if information (e.g. information that is 0.9 times the lifespan) obtained by reducing the lifespan indicated by the lifespan information by a predetermined number is the same as or is greater than the use history indicated by the obtained use history information. In more detail, if the use number indicated by the lifespan information is 100 times, the lifespan determining unit 40 may change the lifespan information to 95 times and compare the lifespan information with the use history information.

For example, if the use number indicated by the use history information is 90 times and the use number indicated by the lifespan information is 100 times, by using the use history information and the lifespan information as the use number, the lifespan determining unit 40 may determine that the useful lifespan of the parts has not come to an end. If the use number indicated by the use history information is 101 times and the use number indicated by the lifespan information is 100 times, the lifespan determining unit 40 may determine that the useful lifespan of the parts is about to come to an end or has come to an end. The lifespan determining unit 40 may convert information when comparing the use history information with the lifespan information. For example, if the use history information indicates a use start time and the lifespan information indicates a use period, the lifespan determining unit 40 may change the use history information to information indicating the use period by using the use start time indicated by the use history information and determination time and compare the changed use history information with the lifespan information. The lifespan determining unit 40 may obtain the determination time from a calendar unit (not shown) or a clock unit (not shown). The lifespan determining unit 40 may temporarily store the parts identification information used to identify the parts whose lifespan has expired in a recording medium (not shown).

The lifespan expiration information outputting unit 41 outputs lifespan expiration information including at least the parts identification information used to identify the parts whose useful lifespan is determined to have expired. For example, when the lifespan determining unit 40 temporarily stores the parts identification information used to identify the parts whose lifespan is determined to have expired in the recording medium, the lifespan expiration information outputting unit 41 may read and obtain the parts identification information used to identify the parts whose lifespan is determined to have expired from the recording medium. The lifespan expiration information may include any types of information if it concerns information used to identify the parts whose lifespan has come to an end. For example, the lifespan expiration information may be order information about the parts whose lifespan has expired or information indicating only that lifespan of parts has expired. The lifespan expiration information may be included in the lifespan expiration information outputting unit 41 or in another element. For example, if a template of the lifespan expiration information is stored in the recoding medium, the lifespan expiration information outputting unit 41 may insert the parts identification information used to identify the parts whose lifespan has expired to the template of the lifespan expiration information and output the lifespan expiration information.

The outputting of the lifespan expiration information may include, for example, displaying the lifespan expiration information on a display device (e.g., a CRT or a LCD, etc.), transmitting the lifespan expiration information to a predetermined device through a communication line, printing the lifespan expiration information via a printer, outputting sound via a speaker, storing the lifespan expiration information in a recording medium, or transferring the lifespan expiration information to another element. The lifespan expiration information outputting unit 41 may or may not include an outputting device (e.g., the display device, a printer, etc.) The lifespan expiration information outputting unit 41 may be realized in hardware or software, such as a driver for operating a predetermined device.

The parts attribute corresponding information memory unit 33 and the lifespan corresponding information memory unit 39 may be realized in the same recording medium or in different recording media. In the former, an area storing the parts attribute corresponding information is the parts attribute corresponding information memory unit 33, and an area storing the lifespan corresponding information is the lifespan corresponding information memory unit 39.

The operation of the manufacturing apparatus 30 according to the present embodiment will now be described with reference to FIG. 4.

Figure 4:
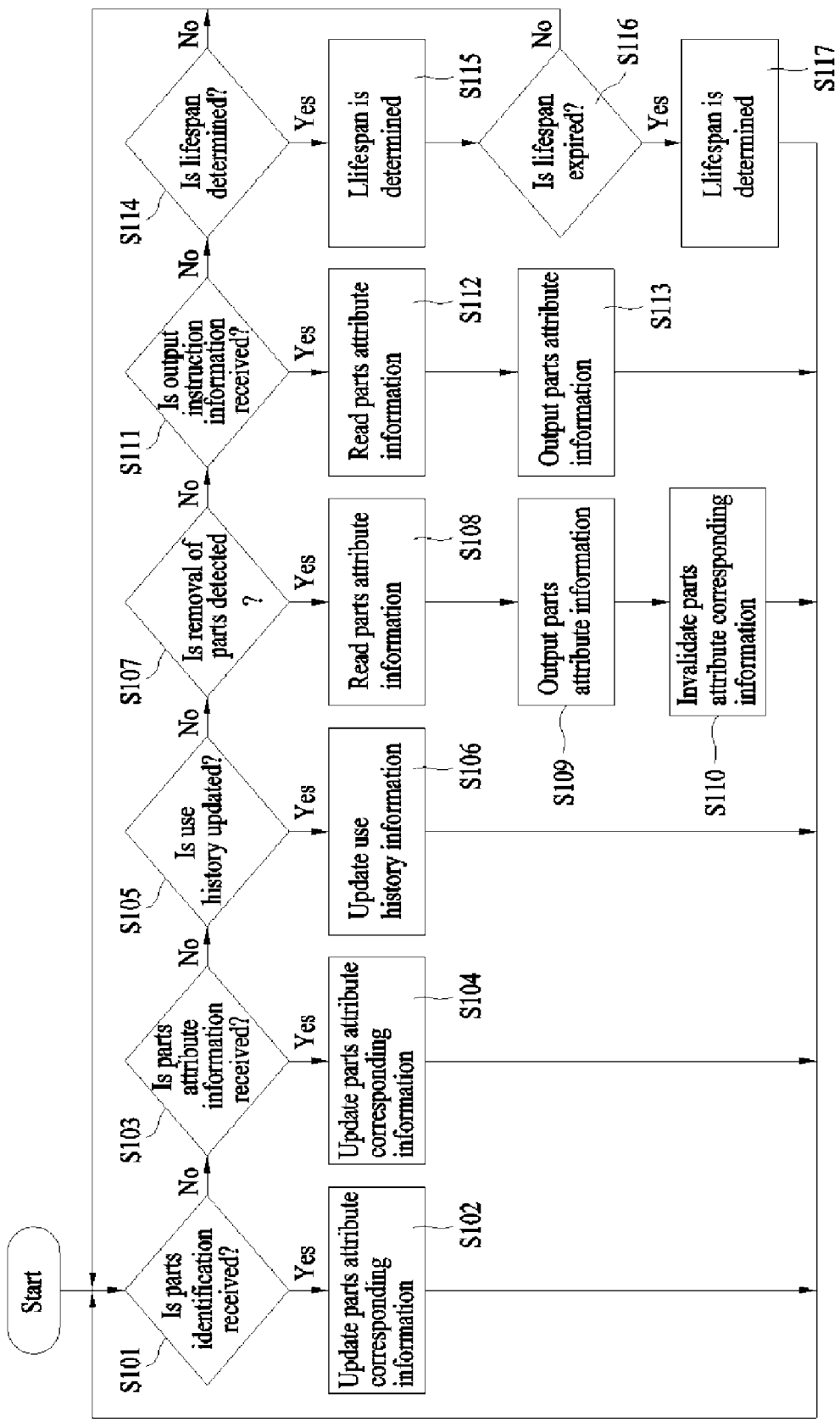
FIG. 4 is a flowchart illustrating the operation of the manufacturing apparatus shown in FIG. 1.

Referring to FIG. 4, in operation S101, the parts identification information receiving unit 31 determines whether parts identification information has been received. If the parts identification information receiving unit 31 determines that the parts identification information has been received, operation S102 is performed. If not, operation S103 is performed.

In operation S102, the parts attribute corresponding information managing unit 34 updates parts attribute corresponding information by using the parts identification information received by the parts identification information receiving unit 31. Then, operation S101 is performed again.

In operation S103, the parts attribute information receiving unit 32 determines whether parts attribute information has been received. If the parts attribute information receiving unit 32 determines that the parts attribute information has been received, operation S104 is performed. If not, operation S105 is performed.

In operation S104, the parts attribute corresponding information managing unit 34 updates the parts attribute corresponding information by using the parts attribute information received by the parts attribute information receiving unit 32. Then, operation S101 is performed again.

In operation S105, the parts attribute corresponding information managing unit 34 determines whether it is time to update use history information included in the parts attribute corresponding information. If the parts attribute corresponding information managing unit 34 determines that it is time to update the use history information, operation S106 is performed. If not, operation S107 is performed. For example, if the parts attribute corresponding information managing unit 34 obtains a use status of the parts on a regular basis and updates the use history information, the parts attribute corresponding information managing unit 34 may determine that it is time to update the use history information on a regular basis. For example, if the parts attribute corresponding information managing unit 34 updates the use history information when having received the use status of the parts from another element, the parts attribute corresponding information managing unit 34 may determine that it is time to update the use history information when having received the use status of the parts from another element.

In operation S106, the parts attribute corresponding information managing unit 34 updates the uses history information of the parts included in the parts attribute corresponding information according to the use status of the parts. Then, operation S101 is performed again.

In operation S107, the parts removal detecting unit 35 determines whether the parts have been removed. If the parts removal detecting unit 35 determines that the parts have been removed, operation S108 is performed. If not, operation S111 is performed.

In operation S108, the first parts attribute information outputting unit 36 reads parts attribute information corresponding to the parts that are detected to have been removed by the parts removal detecting unit 35 from the parts attribute corresponding information memory unit 33.

In operation S109, the first parts attribute information outputting unit 36 outputs the read parts attribute information.

In operation S110, the parts attribute corresponding information managing unit 34 invalidates parts attribute corresponding information corresponding to the parts that are detected to have been removed by the parts removal detecting unit 35. The invalidating of the parts attribute corresponding information may include, for example, deleting the parts attribute corresponding information or establishing a flag indicating invalidation in the parts attribute corresponding information. Then, operation S101 is performed again.

In operation S111, the output instruction information receiving unit 37 determines whether output instruction information has been received. If the output instruction information receiving unit 37 determines that the output instruction information has been received, operation S112 is performed. If not, operation S114 is performed.

In operation S112, the second parts attribute information outputting unit 38 reads parts attribute information, which is instructed to be output from the output instruction information received by the output instruction information receiving unit 37, from the parts attribute corresponding information memory unit 33.

In operation S113, the second parts attribute information outputting unit 38 outputs the read parts attribute information. Then, operation S101 is performed again.

In operation S114, the lifespan determining unit 40 determines whether it is time to determine whether the useful lifespan of the parts has come to an end. If the lifespan determining unit 40 determines that it is time to determine whether the useful lifespan of the parts has come to an end, operation S115 is performed. If not, operation S101 is performed again. The lifespan determining unit 40 may, for example, determine that it is time to determine whether the useful lifespan of the parts has come to an end on a regular basis or may determine that it is time to determine whether the useful lifespan of the parts has come to an end when an occurrence of a predetermined event is detected. The predetermined event may be, for example, a receipt of an instruction to determine the lifespan of the parts from a user.

In operation S115, the lifespan determining unit 40 determines whether the useful lifespan of the parts corresponding to the parts attribute corresponding information stored in the parts attribute corresponding information memory unit 33 has come to an end.

In operation S116, the lifespan determining unit 40 determines whether there are parts whose lifespan is determined to have expired. If the lifespan determining unit 40 determines that there are parts whose lifespan is determined to have expired, operation S117 is performed. If not, operation S101 is performed again.

In operation S117, the lifespan expiration information outputting unit 41 outputs lifespan expiration information including at least parts identification information of the parts whose lifespan is determined to have expired. Then, operation S101 is performed again.

The operation of the manufacturing apparatus 30 of the present embodiment shown in FIG. 4 ends with a power off or an ending process. Operations S101 and S103 may be performed simultaneously. In this case, operations S102 and S104 may be performed simultaneously.

The operation of the manufacturing apparatus 30 of the present embodiment will now be described by two examples.

In a first example, an RFID installed in the parts includes the parts identification information and the parts attribute information. In a second example, a two dimensional barcode installed in the parts includes the parts identification information and the server device 10 includes the parts attribute information.

First Example

A part (hereinafter referred to as "part P001" which may be applied to other parts) identified by parts identification information 'P001' is installed in the manufacturing apparatus 30. An RFID reader and writer installed in the manufacturing apparatus 30 detects the part P001 installed in the manufacturing apparatus 30 and reads the parts identification information 'P001' and parts attribute information about the parts P001 from the RFID (operations S101 and S103). The parts attribute information includes a name of the part 'AAA', a model number thereof '1234', and use history information '0'.

The parts attribute corresponding information managing unit 34 stores the parts attribute correspondingly information relating the parts identification information P001 received by the parts identification information receiving unit 31 to the parts attribute information received by the parts attribute information receiving unit 32 in the parts attribute corresponding information memory unit 33 (operations S102 and S104). A first record of FIG. 5 shows the parts attribute corresponding information stored in this manner.

Thereafter, a semiconductor process is performed with respect to a substrate to be processed and thus the part P001 is used one time. The parts attribute corresponding information managing unit 34 detects that the part P001 is used one time (operation S105). In the parts attribute corresponding information memory unit 33, use history information corresponding to the parts identification information P001 is increased by '1' (operation S106). As a result, the parts attribute corresponding information is shown in FIG. 6.

A process of determining the lifespan of the parts will now be described.

In the first example, the lifespan corresponding information memory unit 39 stores lifespan corresponding information shown in FIG. 7. Parts type identification information is related to lifespan information in the lifespan corresponding information. The parts type identification information includes a name and a model number of each part. The lifespan information includes a use number of each part. That is, if the use number of the part is the use number indicated by the lifespan information, the lifespan of the part is determined to have expired.

The semiconductor process is repeatedly performed with respect to the substrate to be processed and thus a plurality of pieces of parts attribute corresponding information is shown in FIG. 8. That is, the use number of the part P001 is 20 times. The lifespan determining unit 40 determines the lifespan of the parts on a regular basis and determines that it is time to determine the lifespan of the parts (operation S114). Then, the lifespan determining unit 40 obtains the name of the parts 'AAA', the model number thereof '1234', and the use history information '20' included in first parts attribute corresponding information from the plurality of pieces of parts attribute corresponding information shown in FIG. 8, and searches for the lifespan corresponding information shown in FIG. 7 by using the name of the parts 'AAA' and the model number thereof '1234' as search keys. Then, first lifespan corresponding information is relevant (hit). The lifespan determining unit 40 reads lifespan information '20' from the first lifespan corresponding information. The lifespan determining unit 40 determines whether the use history information '20' is equal to or greater than the obtained lifespan information '20'. In this case, since the use history information is equal to or greater than the lifespan information, the lifespan determining unit 40 determines that the useful lifespan of the parts corresponding to the first parts attribute corresponding information has come to an end. The lifespan determining unit 40 determines whether the useful lifespan of parts corresponding to other parts attribute corresponding information has come to an end (operation S115). The lifespan of the parts corresponding to the first parts attribute corresponding information shown in FIG. 8 is determined to have expired. The lifespan determining unit 40 determines that there are parts whose lifespan has expired (operation S116), reads the parts identification information P001 from the first parts attribute corresponding information, and sends the parts identification information P001 to the lifespan expiration information outputting unit 41. The lifespan expiration information outputting unit 41 outputs lifespan expiration information including the parts identification information P001 obtained from the lifespan determining unit 40 (operation S117). The lifespan expiration information may include, for example, text data indicating that the parts identified by the parts identification information P001 have been completely consumed. When the lifespan expiration information is displayed, a user who sees the lifespan expiration information can understand that the parts identified by the parts identification information P001 have been completely used.

Next, a process of removing the parts will now be described.

Part P101 corresponding to second parts attribute corresponding information shown in FIG. 8 has been removed from the manufacturing apparatus 30. Then, the RFID reader and writer acting as the parts removal detecting unit 35 detects removal of the part P101 (operation S107) and sends parts identification information P101 used to identify the parts to the parts attribute corresponding information managing unit 34 and the first parts attribute information outputting unit 36. The first parts attribute information outputting unit 36 reads parts attribute information including use history information '12' from parts attribute corresponding information corresponding to the parts identification information P101 (operation S108) and writes the use history information '12' in the RFID installed in the parts P101 (operation S109). That is, the first parts attribute information outputting unit 36 is regarded as the RFID reader and writer. As a result, the RFID installed in the part P101 has the same parts attribute corresponding information as the second parts attribute corresponding information shown in FIG. 8. The parts attribute corresponding information managing unit 34 deletes the parts attribute corresponding information corresponding to the parts identification information P101, i.e. the second parts attribute corresponding information in FIG. 8, from the parts attribute corresponding information memory unit 33 (operation S110). Thereafter, when the removed parts P101 are installed in one of the manufacturing apparatuses 30, as described above, the parts attribute information including the use history information '12' is read from the RFID of the part P101 and is stored in the parts attribute corresponding information memory unit 33 so that the manufacturing apparatus 30 in which the part P101 is installed controls the parts attribute corresponding information including the use history of the parts.

Next, a process of receiving output instruction information will now be described.

When the parts attribute corresponding information memory unit 33 stores the parts attribute corresponding information shown in FIG. 8, the output instruction information receiving unit 37 receives output instruction information including the parts identification information P001 (operation S111). Then, the second parts attribute information outputting unit 38 searches for the parts attribute corresponding information memory unit 33 by using the parts identification information P001 as a search key, reads parts attribute information from the relevant (hit) first parts attribute corresponding information, and outputs the parts attribute information (operations S112 and S113). As a result, the user may be informed of a name, a model number or a use history of the part P001 from the parts attribute information corresponding to the parts P001.

Second Example

In the second example, the server device 10 includes parts attribute information. FIG. 9 is a table showing parts attribute information included in the server device 10 according to an embodiment of the present invention. Referring to FIG. 9, the server device 10 includes the parts attribute information corresponding to parts identification information.

When the part P001 is installed in the manufacturing apparatus 30, a barcode reader reads the parts identification information P001 included in a two dimensional barcode installed in the part P001 (operation S101). Then, the parts attribute corresponding information managing unit 34 stores parts attribute corresponding information including the parts identification information P001 in the parts attribute corresponding information memory unit 33 (operation S102). Thereafter, a parts attribute information requesting unit (not shown) requests the server device 10 to transmit the parts attribute information identified by the parts identification information P001. The server device 10 searches for the parts attribute information shown in FIG. 9, reads the parts attribute information corresponding to the parts identification information P001, and transmits the parts attribute information to the manufacturing apparatus 30 requesting the parts attribute information. The parts attribute information receiving unit 32 receives the parts attribute information including a name of the parts 'AAA', a model number thereof '1234', and use history information '3', and sends the parts attribute information to the parts attribute corresponding information managing unit 34 (operation S103). The parts attribute corresponding information managing unit 34 writes the received parts attribute information in the stored parts attribute corresponding information of the parts identification information P001 (operation S104). In this regard, the server device 10 may or may not delete the parts attribute information corresponding to the parts identification information P001.

The manufacturing apparatus 30 updates the use history information, determines the lifespan of the parts, and outputs the parts attribute information according to the output instruction information received, in the same manner as described in the first example and thus a detailed description thereof will not be repeated here. Every time the use history information is updated, the updated use history information may or may not be transmitted to the sever device 10. In the former, if the server device 10 includes the parts attribute information, the server device 10 may include the latest parts attribute information.

Next, a process of removing the parts will now be described.

When the parts are removed, the parts attribute corresponding information stored in the parts attribute corresponding information memory unit 33 is shown in FIG. 8. If the parts removal detecting unit 35 detects removal of the part P001 (operation S107), the parts identification information P001 used to identify the part P001 is sent to the parts attribute corresponding information managing unit 34 and the first parts attribute information outputting unit 36. The first parts attribute information outputting unit 36 reads parts attribute information including use history information '20' from parts attribute corresponding information corresponding to the parts identification information P001 (operation S108) and transmits the parts attribute information corresponding to the parts identification information P001 to the server device 10 (operation S109). As a result, the parts attribute information included in the server device 10 is updated as shown in FIG. 10. The parts attribute corresponding information managing unit 34 deletes the parts attribute corresponding information corresponding to the obtained parts identification information P001, i.e. the first parts attribute corresponding information shown in FIG. 8, from the parts attribute corresponding information memory unit 33 (operation S110).

As described above, the manufacturing apparatus 30 of the present invention manages information about the parts of the manufacturing apparatus 30, so that the information is unitarily managed. Thus, a user who desires to know the information about the parts accesses the manufacturing apparatus 30, thereby avoiding a difference in the information about the parts.

The manufacturing apparatus 30 manages information about the parts of the manufacturing apparatus 30, thereby avoiding a semiconductor process failure caused by use of inappropriate parts or an operating failure of the manufacturing apparatus 30.

The manufacturing apparatus 30 obtains past use history information when the parts are installed or outputs use history information when the parts are removed, thereby accurately managing the use history information even though the parts are exchanged between the manufacturing apparatuses 30.

The managing of the use history information results in the lifespan expiration information being output, thereby, for example, newly preparing parts or exchanging parts.

Although the manufacturing apparatus 30 determines the lifespan of the parts in the present embodiment, such determination may not be performed. In the case where determination is not performed, the manufacturing apparatus 30 may not include the lifespan corresponding information memory unit 39, the lifespan determining unit 40, and the lifespan expiration information outputting unit 41.

Although the manufacturing apparatus 30 includes the output instruction information receiving unit 37 and the second parts attribute information outputting unit 38 in the present embodiment, such elements may not be included in the manufacturing apparatus 30. In the case where they are not included, for example, the parts attribute corresponding information memory unit 33 may be an attachable and detachable recording medium and may be removed from the manufacturing apparatus 30, so that an external device may use the parts attribute corresponding information.

Although the manufacturing apparatus 30 includes the first parts attribute corresponding information outputting unit 36 that outputs parts attribute information when the parts are removed in the present embodiment, such an element may not be included in the manufacturing apparatus 30. In this case, the manufacturing apparatus 30 may not include the parts removal detecting unit 35.

Although the manufacturing apparatus 30 is a stand alone unit in the present embodiment, the manufacturing apparatus 30 may be a server device of a server and client system. In the latter case, an outputting unit or a receiving unit may receive an input through a communication line or may output a screen.

In the present embodiment, each process or each function may be performed by a single device or a single system or may be performed by a plurality of devices or a plurality of systems.

In the present embodiment, information about a process performed by each element, for example, information received, obtained, selected, generated, transmitted, or received by each element or information about a threshold, equation, address or the like used to perform a process by each element, although not expressed above, may be included in a recording medium (not shown) temporarily or for a long time. Each element or a storage unit (not shown) may store the information in the recording medium. Each element or a reading unit (not shown) may read the information from the recording medium.

In the present embodiment, if two or more elements included in the manufacturing apparatus 30 include a communication device or an input device, two or more elements may physically include a single device or separate devices.

In the present embodiment, each element may be realized in dedicated hardware or an element realized in software may be realized by executing a program. For example, a program executing unit like a central processing unit (CPU) reads and executes software and a program recorded on a recording medium such as a hard disk or a semiconductor memory, so that each element may be realized. In the present embodiment, software used to realize the manufacturing apparatus 30 is a program which makes a computer operate as a parts identification information receiving unit that receives parts identification information used to identify parts of a manufacturing apparatus for performing a semiconductor process with regard to a substrate to be processed, a parts attribute information receiving unit that receives parts attribute information indicating the attribute of the parts identified by the parts identification information received by the parts identification information receiving unit, and a parts attribute corresponding information managing unit that updates parts attribute corresponding information that is stored in a parts attribute corresponding information memory unit and that is information where parts identification information identifying the parts of the manufacturing apparatus corresponds to parts attribute information identified by the parts identification information by using the parts identification information received by the parts identification information receiving unit and the parts attribute information received by the parts attribute information receiving unit.

A process performed only by hardware when information is received, e.g. a process performed by a modem or an interface card, is performed separately instead of being performed by the program.

The program may be executed by being downloaded from a server or reading a program stored on a predetermined recording medium (for example, an optical disk like CD-ROM or a magnetic disk, a semiconductor memory, etc.)

A single computer or a plurality of computers may execute the program. That is, the program may be executed unitarily or separately.

Figure 11:
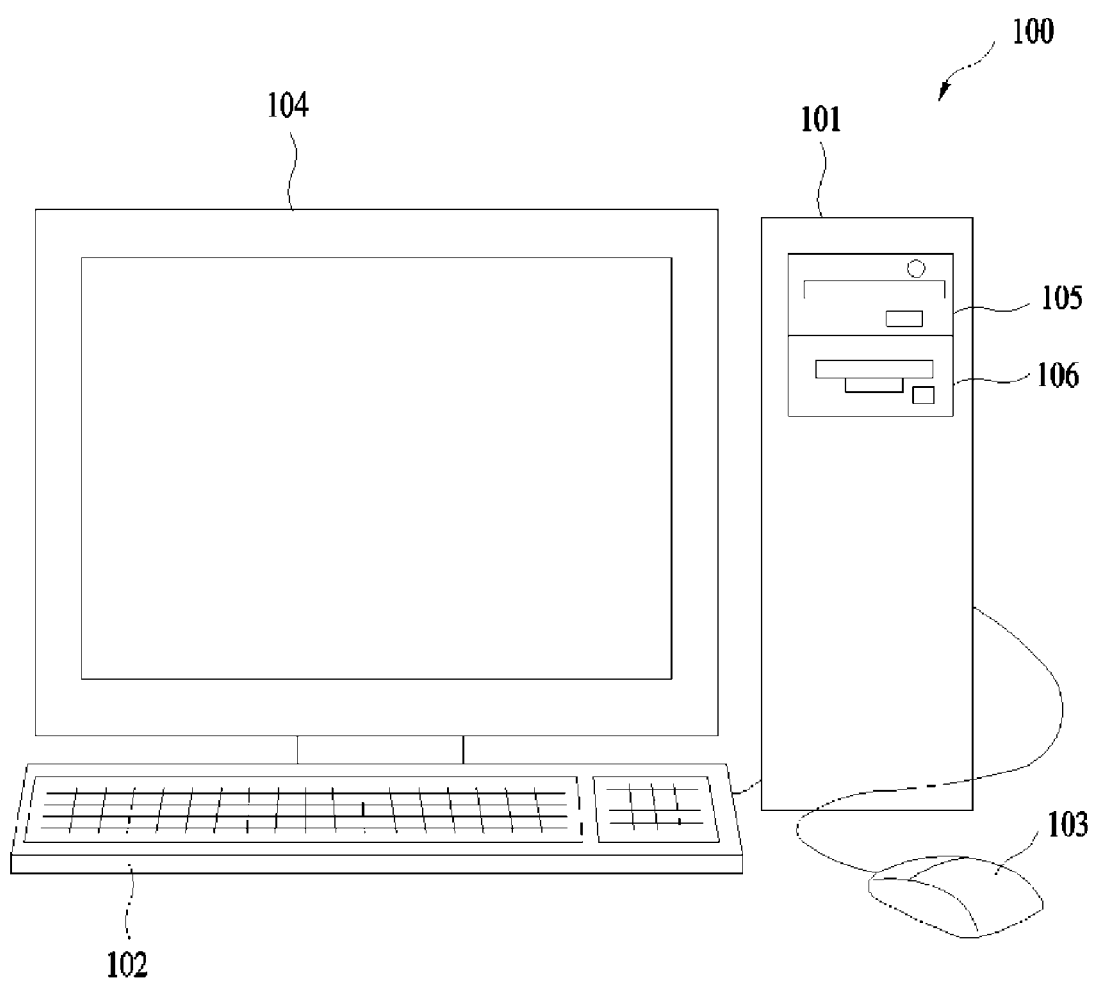
FIG. 11 is a schematic view showing an example of the appearance of a computer system according to the embodiment of the present invention.

FIG. 11 is a schematic view showing the appearance of a computer system 100 for executing the program and implementing the manufacturing apparatus 30. Referring to FIG. 11, the computer system 100 is realized by computer hardware and a computer program executed therein.

The computer system 100 includes a computer 101 including a CD-ROM drive 105 and a flexible disk (FD) drive 106, a keyboard 102, a mouse 103, and a monitor 104.

Figure 12:
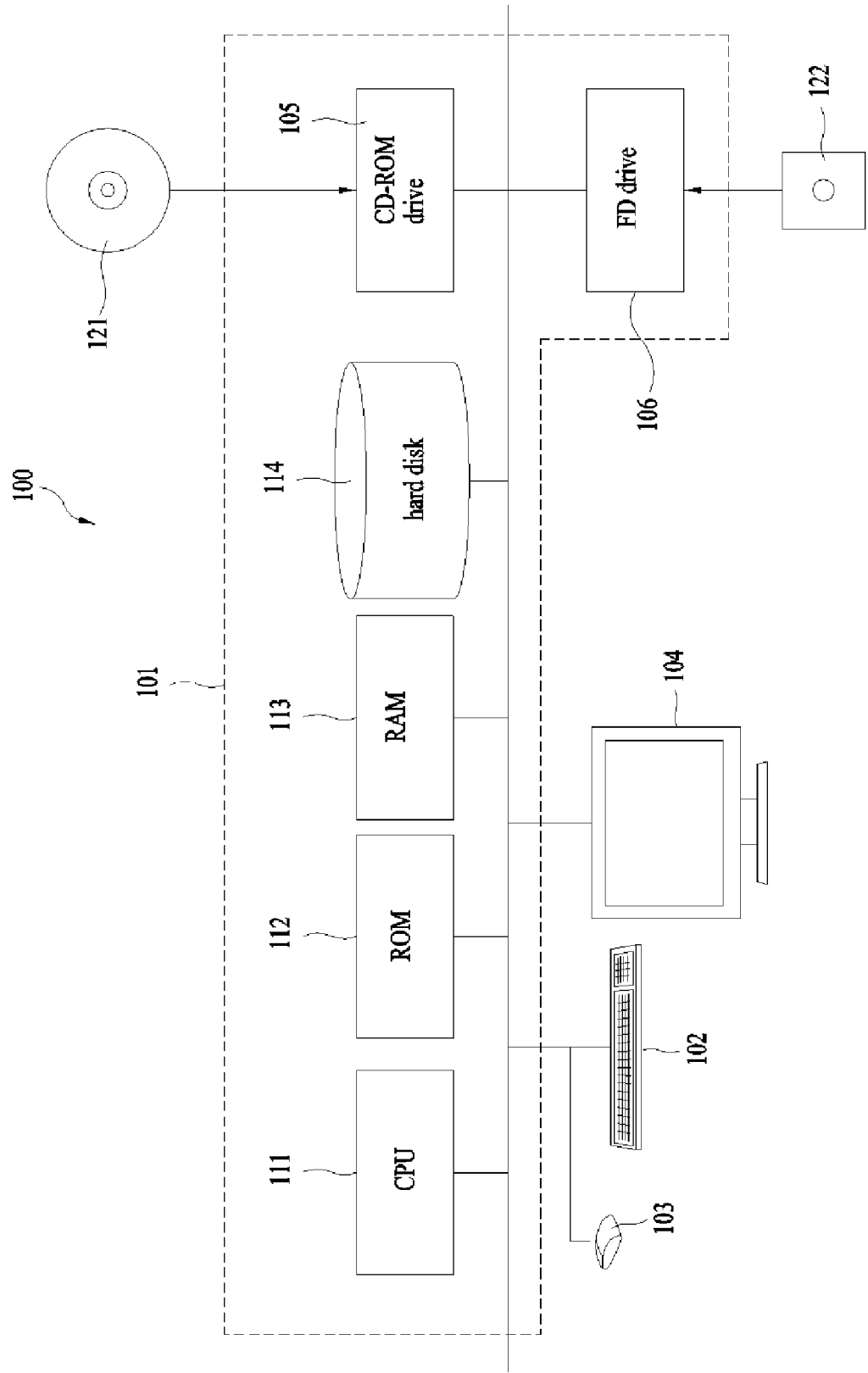
FIG. 12 is a block diagram of an example of a computer system according to the embodiment of the present invention.

FIG. 12 is a block diagram of the computer system 100 according to an embodiment of the present invention. Referring to FIG. 12, the computer 101 includes, in addition to the CD-ROM drive 105 and the FD drive 106, a CPU 111, a ROM 112 for storing a boot-up program, a RAM 113 that is connected to the CPU 111, which temporarily stores instructions of an application program and provides a temporal storage space, a hard disk 114 that stores the application program, a system program, and data, and a bus 115 that are correlated to the CPU 111 and the ROM 112. The computer 101 may include a network card (not shown) used to connect a local area network (LAN).

A program executing a function of the manufacturing apparatus 30 may be stored in a CD-ROM 121 or an FD 122, may be inserted into the CD-ROM drive 105 or the FD drive 106, and may be transmitted to the hard disk 114. Alternatively, the program may be transmitted to the computer 101 over a network (not shown) and be stored in the hard disk 114. The program may be loaded on RAM 113 at the time of execution. The program may be directly loaded from the CD-ROM 121, the FD 122, or the network.

The program may or may not include an operating system (OS) for executing the function of the manufacturing apparatus 30 or a third party program. The program may include an instruction part used to obtain a desired result by using a controlled proper function (module). The operation of the computer system 100 is well known and thus a detailed description thereof will not be given here.

The manufacturing apparatus according to the present invention appropriately manages information about parts of the manufacturing apparatus on the basis of parts actually used in the manufacturing apparatus. Therefore, the manufacturing apparatus according to the present invention is useful for a manufacturing apparatus that performs a semiconductor process.

While the present invention has been particularly shown and described with reference to exemplary embodiments thereof, it will be understood by those of ordinary skill in the art that various changes in form and details may be made therein.

What is claimed is:

1. A manufacturing apparatus for performing a semiconductor process with respect to a substrate to be processed, the manufacturing apparatus comprising:
- a parts identification information receiving unit receiving parts identification information used to identify parts of the manufacturing apparatus;
- a parts attribute information receiving unit receiving parts attribute information indicating the attribute of the parts identified by the parts identification information received by the parts identification information receiving unit;
- a parts attribute corresponding information memory unit storing parts attribute corresponding information where the parts identification information identifying the parts of the manufacturing apparatus corresponds to parts attribute information identified by the parts identification information; and
- a parts attribute corresponding information managing unit updating the parts attribute corresponding information by using the parts identification information received by the parts identification information receiving unit and the parts attribute information received by the parts attribute information receiving unit.

2. The manufacturing apparatus of claim 1, wherein the parts attribute corresponding information managing unit stores the parts attribute corresponding information including the parts identification information of the parts indicated in the parts attribute corresponding information memory unit when the parts are installed in the manufacturing apparatus, and
- wherein the parts attribute information includes use history information about a use history of the parts.

3. The manufacturing apparatus of claim 2, wherein the parts attribute corresponding information managing unit updates the use history information according to a use status of the parts.

4. The manufacturing apparatus of claim 2, wherein the parts attribute information receiving unit further receives parts attribute information including past use history information of the parts installed in the manufacturing apparatus, and
- wherein the parts attribute corresponding information managing unit updates the parts attribute information of the parts attribute corresponding information corresponding to the parts attribute information by using the past use history information included in the parts attribute information received by the parts attribute information receiving unit.

5. The manufacturing apparatus of claim 2, further comprising: when the parts have been removed from the manufacturing apparatus, a first parts attribute information outputting unit outputting the parts attribute information including the use history information included in the parts attribute corresponding information about the parts.

6. The manufacturing apparatus of claim 2, wherein the parts attribute corresponding information includes parts type identification information used to identify a type of the parts, further comprising:
- a lifespan corresponding information memory unit storing lifespan corresponding information where the parts type identification information corresponds to lifespan information indicating a useful lifespan of the parts;
- a lifespan determining unit determining whether the useful lifespan of the parts corresponding to the parts attribute corresponding information has come to an end by using the lifespan information corresponding to the parts type identification information included in the parts attribute corresponding information and the use history information included in the parts attribute corresponding information; and
- a lifespan expiration information outputting unit outputting lifespan expiration information including at least the parts identification information of the parts whose lifespan is determined to have expired by the lifespan determining unit.

7. The manufacturing apparatus of claim 1, further comprising:
- an output instruction information receiving unit receiving output instruction information for instructing the parts attribute information included in the parts attribute corresponding information to be output; and
- a second parts attribute information outputting unit reading parts attribute information instructed to be output from the output instruction information received by the output instruction information receiving unit from the parts attribute corresponding information memory unit and outputting the parts attribute information.

8. An information processing method used by a manufacturing apparatus for performing a semiconductor process with respect to a substrate to be processed, the information processing method comprising:
- receiving parts identification information used to identify parts of the manufacturing apparatus;
- receiving parts attribute information indicating attributes of the parts identified by the parts identification information received by a parts identification information receiving unit; and
- updating parts attribute corresponding information that is stored in a parts attribute corresponding information memory unit and that is information where the parts identification information identifying the parts of the manufacturing apparatus corresponds to parts attribute information identified by the parts identification information, by using the parts identification information received by the parts identification information receiving unit and the parts attribute information received by the parts attribute information receiving unit.

9. A program recorded on a computer non-transitory readable medium for performing a semiconductor process with respect to a substrate to be processed, the program making a computer operate as:
- a parts identification information receiving unit receiving parts identification information used to identify parts of a manufacturing apparatus for performing a semiconductor process with respect to a substrate to be processed;
- a parts attribute information receiving unit receiving parts attribute information indicating the attributes of the parts identified by the parts identification information received by the parts identification information receiving unit; and a parts attribute corresponding information managing unit updating parts attribute corresponding information that is stored in a parts attribute corresponding information memory unit and that is information where the parts identification information identifying the parts of the manufacturing apparatus corresponds to parts attribute information identified by the parts identification information, by using the parts identification information received by the parts identification information receiving unit and the parts attribute information received by the parts attribute information receiving unit.

* * * * *